United States Patent [19]
Nordskog

[11] 4,440,443
[45] Apr. 3, 1984

[54] HEADREST

[76] Inventor: Robert A. Nordskog, 16000 Strathern St., Van Nuys, Calif. 91406

[21] Appl. No.: 252,938

[22] Filed: Apr. 10, 1981

[51] Int. Cl.³ .............................................. A47C 7/36
[52] U.S. Cl. .................................... 297/397; 297/191
[58] Field of Search .............. 297/397, 396, 391, 220, 297/284, 188, 191; 5/464

[56] References Cited

U.S. PATENT DOCUMENTS

| | | | |
|---|---|---|---|
| 2,464,435 | 3/1949 | Conradt | 297/397 |
| 2,867,266 | 1/1959 | Vogler | 297/397 X |
| 3,156,500 | 11/1964 | Kerr | 297/397 X |
| 3,210,781 | 10/1965 | Pollock | 5/464 |
| 3,479,085 | 11/1969 | Weinstein | 297/191 |
| 3,512,605 | 5/1970 | McCorkle | 297/397 |
| 3,608,964 | 9/1971 | Earl | 297/397 |
| 4,165,125 | 8/1979 | Owen | 297/220 |
| 4,218,792 | 8/1980 | Kogan | 5/464 |

FOREIGN PATENT DOCUMENTS

| | | | |
|---|---|---|---|
| 2856366 | 2/1980 | Fed. Rep. of Germany | 297/397 |
| 6602361 | 8/1966 | Netherlands | 297/397 |
| 258350 | 9/1926 | United Kingdom | 297/397 |

*Primary Examiner*—Francis K. Zugel

*Attorney, Agent, or Firm*—John J. Posta, Jr.

[57] ABSTRACT

The improved resilient flexible headrest of the present invention is inflated with air or fluid, or is filled with foamed plastic material, preferably of various resiliencies. The headrest can be formed of plastic, cloth or the like, and has a cavity within which the upper end of the backrest of a chair, couch or the like is receivable. The headrest includes means for securing the headrest in place to the backrest, preferably releasably. The body of the headrest may be structurally reinforced with stiffening elements and preferably has forwardly extending privacy wings which may be hinged and which include sound system speakers or the like. Alternately, the wings may be bridged by a privacy roof. The roof may have an eye shield such as a cloth or the like attached thereto and lowerable from the front thereof. A pocket with a transparent outer facing may be disposed on the outer surface of the body of the headrest to releasably receive a ticket, advertising indicia or the like. In one embodiment, the headrest may be U-shaped in plan view and include one or more straps and cinch means to releasably hold the headrest in place around the top of a backrest. The wing can be contoured to provide a lower, inwardly extending portion to better support the head and/or retain a pillow in place.

5 Claims, 9 Drawing Figures

HEADREST

BACKGROUND OF THE INVENTION

1. Field of the Invention

The present invention generally relates to cushioning means and more particularly to headrests of an improved type.

2. Prior Art

The usual type of cushioned headrest, if any, in an airplane, train or bus chair seat is a thin relatively hard pad more or less permanently affixed to the front of the upper end of the chair backrest. In most instances no true cushioned headrest at all is provided. On long trips passengers may be given small pillows to place behind their heads, but these slip around and usually do not provide full comfort and head support. Moreover, the headrests become dirty in use and unsanitory, requiring the use of cloths thereover.

Accordingly, it would be desireable to provide an improved type of headrest which could be attached to the backrest of a chair, sofa, etc., and which would provide improved comfort, sanitation and cushioning of the head and also improved privacy. The headrest preferably should also be readily attachable to and detachable from the backrest and easily stored when detached.

SUMMARY OF THE INVENTION

The improved headrest of the present invention satisfies all the foregoing needs. The headrest is substantially as described in the Abstract above. Thus, it comprises a body of plastic, rubber or cloth filled with air or fluid or a foamed plastic filled with a gas. In one embodiment the headrest is inflatable. The body defines a cavity within which the upper end of a backrest is receivable. The headrest may also be releasably attached to the backrest via velcro strips or the like.

The body can be contoured to provide a base support for a removable pillow. The body preferably includes forwardly extending privacy wings which may be hinged for folding for storage. The wings preferably house sound system speakers, or the like. In one embodiment, the wings are bridged by a roof which can bear an eye shield lowerable from the front edge of the roof. The wings can be contoured to provide a lower, inwardly directed head support portion.

The gas bearing foamed plastic used to fill the body in one embodiment may have different resiliencies from area to area, for example, with the greatest resiliency in the head support area and the firmest consistency in the structural support areas, wings, etc.

In a separate embodiment, the improved headrest is provided in the form of a "U" when viewed from above, with the sides of the U comprising the wings and the base of the U comprising the head support. The headrest includes one or more straps and means for releasably cinching the straps around the upper end of a backrest releasably to hold the headrest in place.

The headrest is particularly useful for long distance trips on planes, in cars, buses, trains and the like where it is important to be able to rest comfortably without distraction and sleep with improved head support. The headrest can be made easily, inexpensively and durable in a number of forms.

The headrest is really a head support device, which provides additional support for the head while resting or sleeping than is presently available in common backs of chairs. In several embodiments hereafter shown and described, the headrest is designed to provide means to effectively nest the head within the headrest to achieve increased support of the head, especially when a person is asleep.

The headrest can, in a given embodiment, be made from a semi-solid material, such as foamed plastic, or can be made inflatable, so afford easy storage when not in use.

Further features of the invention are set forth in the following detailed description and accompanying drawings.

DETAILED DESCRIPTION OF THE PREFERRED EMBODIMENT

Figures 1, 2, 3, 9:
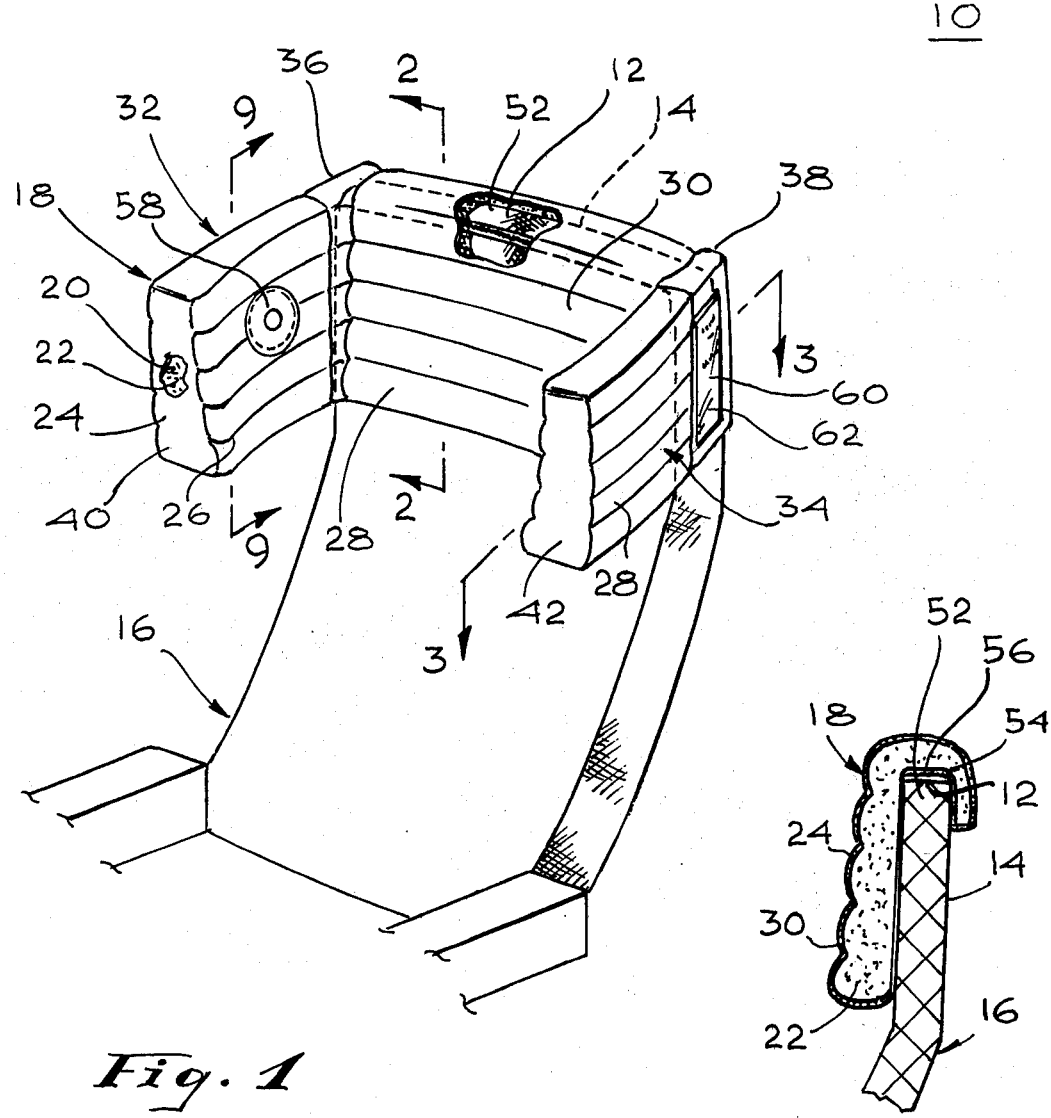
FIG. 1 is a schematic perspective view from the front, partly broken away, of a first preferred embodiment of the improved headrest of the present invention, shown with the headrest installed on the upper end of a seat backrest.
FIG. 2 is a schematic section taken along the section line 2—2 of FIG. 1.
FIG. 3 is a schematic section taken along the section line 3—3 of FIG. 1.
FIG. 9 is a schematic section taken along line 9—9 of FIG. 1.

Now referring more particularly to FIGS. 1-4 of the accompanying drawings, a first preferred embodiment of the improved headrest of the present invention is schematically depicted therein. Thus, in FIGS. 1-4, headrest 10 is shown releasably installed on the upper end 12 of backrest 14 of an airline, bus, train or theater chair seat 16, or the like. Headrest 10 comprises a body 18 fabricated of a core 20 of flexible resilient foamed plastic material 22 containing air or another gas in the cells thereof. Core 20 is disposed within an outer covering 24 of durable flexible plastic, cloth, rubber, rubberized fabric or the like, tightly sheathing core 20 and provided with parallel spaced reinforcing ribs or stitch lines 26, defining rounded contoured cushioning areas 28.

Body 18 has a generally vertical contoured head-supporting portion 30 adapted to be positioned in front of end 12 of backrest 14, and a pair of spaced forwardly extending parallel side wings 32 and 34 integrally connected at their rear ends 36 and 38, respectively, to the side margins of portion 30. Wings 32 and 34 are provided with forward end portions 40 and 42. Portions 40 and 42 may be physically separated from ends 36 and 38 and in such event are hinged to rear ends 36 and 38, respectively, by internally disposed T-shaped plastic or metal support rods 44 (FIG. 3). Each rod 44 includes an L-shaped arm 46 disposed in rear end 36 or 38 and in portion 30, and arm 48 extending forwardly in portion 42 and hinged at its rear end, or at point 50 to arm 46 (See FIG. 3). Thus, front end portions 40 & 42 can be pivoted towards and away from portion 30. Rods 44 limit the divergance of portions 40 and 42 to the parallel position shown in FIGS. 1, 3 and 4.

As can be more clearly seen in FIG. 2, body 18 defines a cavity 52 within which end 12 of backrest 14 is releasably received to hold headrest 10 in place. Velcro fasteners 54 and 56 secured, respectively, to the top of end 12 and to the opposing face of body 18, releasably secure headrest 10 in the desired position. It will be understood that other types of fasteners such as snap buttons, etc., could be used in addition to or in place of fasteners 54 and 56 and that the connection of headrest 10 to backrest 14 could, if desired, be made permanent by any suitable means (not shown) as by gluing, stitching, etc. Preferably, headrest 10 is readily attached to and detached from backrest 14, as needed.

The foamed material 22 used in portion 30 for comfort purposes preferably is more resilient and less firm than that used in the remainder of body 18, for example, wings 32 and 34, since the latter is desireably more structurally supporting.

It will also be seen from FIG. 1, that wings 32 and 34 can incorporate one or more sound system loudspeakers 58 or the like, of any suitable type positioned advantageously near the user's ears to direct the sound thereto without necessitating the use of annoying earphones, headphones, or the like. Wings 32 and 34 also have the advantage of shielding the sides of the user's face from view and thus act as privacy shields which promote a feeling of safety, security and comfort.

The side of end 38 may be provided with an open-ended pocket 60 having a transparent facing 62, so that a ticket, advertising, a meal selection card, etc., can be inserted and removed from that pocket while not disturbing the user of headrest 10.

Figure 4:
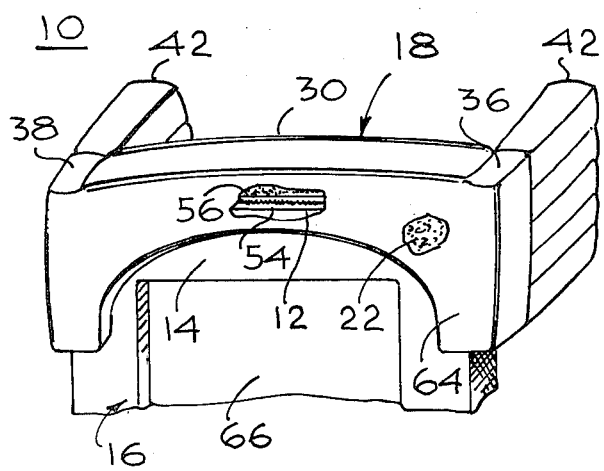
FIG. 4 is a schematic perspective view from the rear, partly broken away, of the headrest of FIG. 1.

As can be seen from FIG. 4, the back 64 of body 18 can wrap around the rear of backrest 14 for a snug fit, but preferably is cut away at least in the center to expose the conventional seat pocket 66 and to save on weight. Back 64 may be made with enough elasticity to allow the side margins thereof to releasably resiliently grip the adjacent side margins of backrest 14 to assure a snug fit.

Thus, headrest 10 offers substantial advantages over the art in providing in a simple, inexpensive, durable manner full comfort and privacy for the occupant of a seat containing the headrest. Restful relaxation is assured. Since headrest 10 is light in weight and can be compact and easily fitted into place, the traveler, theater visitor, etc., may carry the headrest along and fit it into place as needed. Moreover, the headrest has a sufficiently low profile so as not to interfere with the vision of persons seated behind the headrest. The headrest can be easily removed and cleaned as needed to maintain full sanitary requirements.

Figure 6:
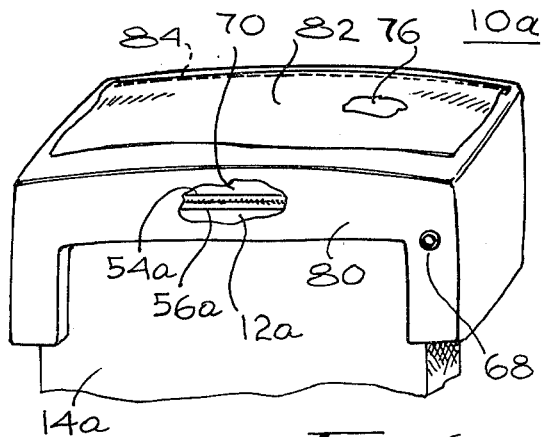
FIG. 6 is a schematic perspective view from the rear, partly broken away, of the headrest of FIG. 5.
Figure 5:
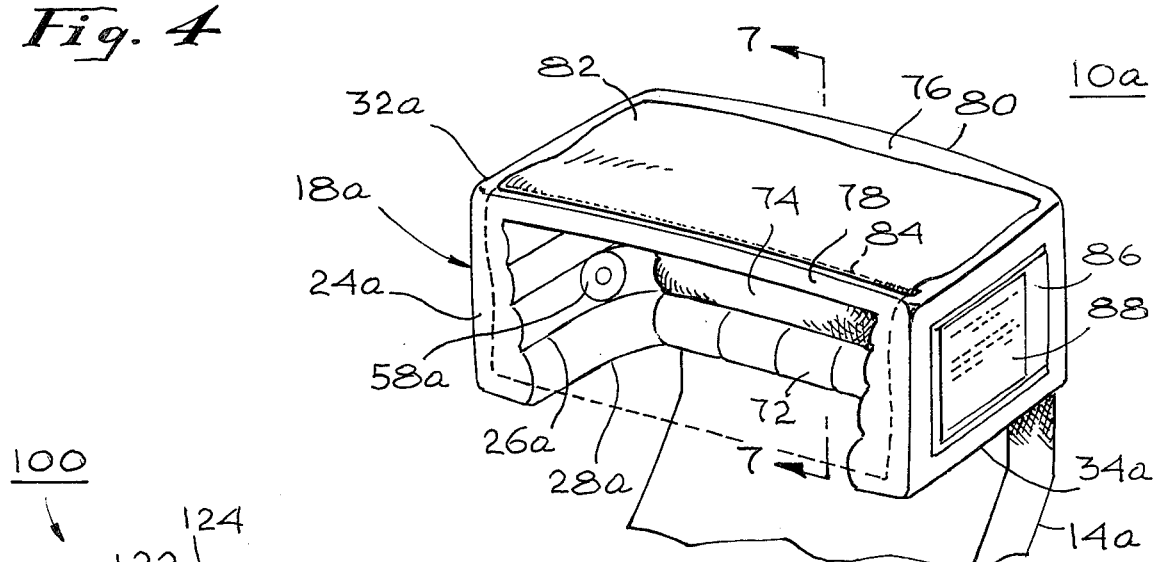
FIG. 5 is a schematic perspective view from the front of a second preferred embodiment of the improved headrest of the present invention, shown installed on the upper end of a seat backrest.
Figure 7:
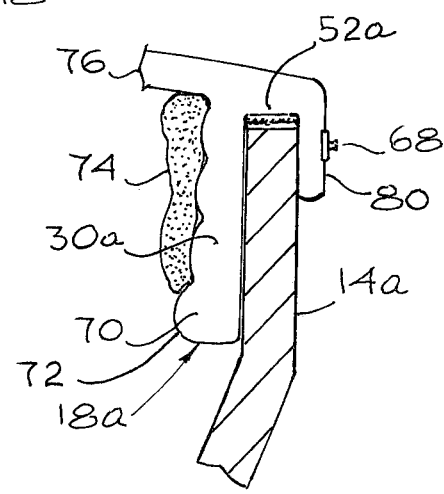
FIG. 7 is a schematic view taken along the section line 7—7 of FIG. 5.

A second preferred embodiment of the improved headrest of the present invention is schematically depicted in FIGS. 5-7. Thus, headrest 10a is shown which is similar in configuration to headrest 10. Components thereof similar to those of headrest 10 bear the same numerals, but are succeeded by the latter "a". Headrest 10a is releasably disposed on the upper end of backrest 14a and comprises a body 18a which is configured similar to body 10 but which is hollow and fully inflatable and deflatable, as by an access tube 68 (FIG. 6).

It will be understood that, if desired, body 10a could comprise one or more permanently inflated cavities.

Body 18a does not contain a core like core 20 filled with foamed material, but instead defines a single cavity 70 filled with air. Cavity 70 is defined by a flexible covering 24a of rubberized cloth, plastic, rubber or the like non-porous resilient material. The surfaces of covering 24a are reinforced with parallel ribs or stitch lines 26a defining rounded support areas 28a. As can be seen from FIG. 7, the lowermost rounded area in head supporting portion 30a is designated 72 and is bulged sufficiently to act as a support for a removable pillow 74, if one is desired.

Wings 32a and 34a bear speakers 58a but are not hinged. Instead, they are bridged by an integral horizontal inflatable privacy roof 76 which extends from the front end 78 to the rear end 80 of headrest 10a (FIGS. 5 and 6). Rear 80 is cut away, as shown in FIG. 6 to save weight to provide access to the rear of backrest 14a. Velcro strips 54a and 56a on, respectively, the upper end 12a of backrest 14a and on the opposing surface of that portion of covering 24a which defines cavity 52a, releasably hold headrest 10a in place on backrest 14a. The side margins of rear end 80 elastically grip the adjacent side margins of backrest 14a to also help hold headrest 10a in place.

A cloth or other type of deployable eye shield 82 may be secured to roof 76, as by sewline 84 and can be stored in the position shown in FIG. 5 or dropped down in front of the user when it is desired to block light so as to permit the user to sleep comfortably. Roof 76 also tends to shield the user from the glare of reading lights, overhead lights, etc., while wings 32a and 34a block off side lights from view. Thus, a comfortable resting nook is provided.

In order to prevent the user from being disturbed by demands for tickets, meal cards, etc., a transparent open-ended pocket 86 of polyethylene, PVA or PVC plastic or the like can be affixed to a suitable location, such as the aisle-facing side of wing 34a, as shown in FIG. 5. Pocket 86 is shown releasably holding a meal selection card 88 therein. Thus, headrest 10a is simple, durable, inexpensive and effective in providing needed rest and relaxation. It can be readily mounted on a chair, chaise lounge, sofa or the like, as the case may be. In such event, it is dimensioned to fit over the upper end of the appropriate item of furniture.

Figure 8:
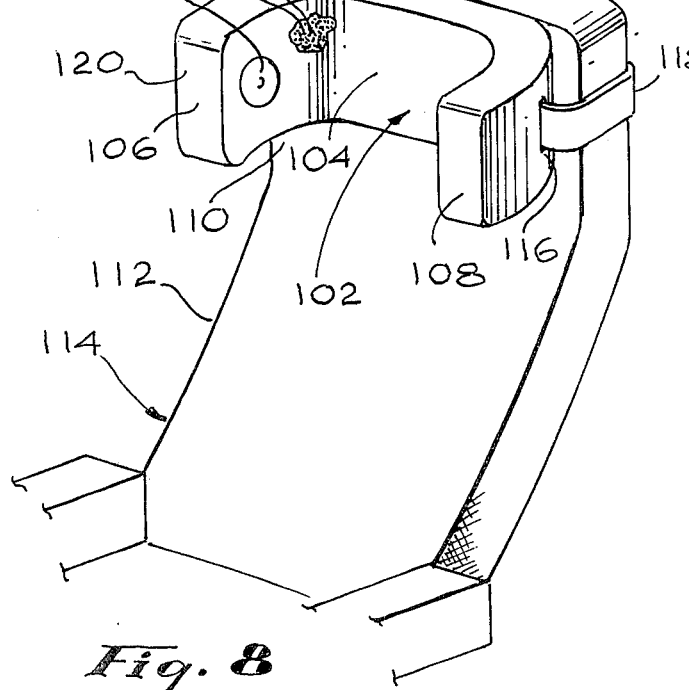
FIG. 8 is a schematic perspective view from the front and partly broken away of a third preferred embodiment of the improved headrest of the present invention, shown installed on the upper end of a seat backrest.

A third preferred embodiment of the improved headrest of the present invention is schematically depicted in FIG. 8. Thus, headrest 100 comprises a body 102 which is generally U-shaped in top plan view. Body 102 has a transversely extending head-supporting base 104 integrally joined at its side margins (ends) to a pair of spaced forwardly extending wings 106 and 108. Base 104 is designed to fit flat against the front of the upper end 110 of the backrest 112 of a chair 114. A channel 116 extends the width of base 104 and receives the midportion of a flexible strap 118, opposite ends of which are releasably secured tightly around end 110 by conventional cinching means such as a buckle, etc. (not shown) to hold headrest 100 in place on a chair 114.

Preferably, body 102 comprises cloth 120 defining a cavity 122 which is tightly fitted with flexible, resilient foamed plastic, such as polyurethane, polystyrene or the like. One or more sound system loudspeakers 126 can be installed in wing 106 and/or 108.

It can, if desired, be fabricated so that cloth 210 is non-porous and so that cavity 122 is devoid of material 124, but is fully inflated with air or the like gas as through an access tube (not shown). Body 102 can thus be made fully inflatable and preferably fully deflatable to simplify carrying of headrest 100 to and from transportation vehicles, theaters, etc., where it is to be used.

FIG. 9 is a cross-section of wing 32 showing a contoured inner surface 130 having a lower, inwardly extending portion 132. Portion 132 serves to support a head placed thereon, as when resting, and/or support a pillow placed against inner surface 130 for additional comfort.

It can be understood that any of the embodiments shown can be made of foamed plastic, or in the alternative, made of an inflatable design to allow for ease of storage.

Various other changes, alterations, modifications and additions can be made in the improved headrest of the present invention, its components and their parameters. All such modifications, changes, alterations and additions as are within the scope of the appended claims form part of the present invention.

What is claimed is:

1. A headrest adapted to be secured to the upper portion of an airplane seat backrest, comprising:
    (a) a resilient body filled with an air-filled, flexible, foam material;
    (b) said body, including a cavity therein disposed at the bottom and back thereof and adapted to be slipped over the top of a seat backrest;
    (c) said body being so designed as to extend a minimal distance above said seat backrest when in its operative position;
    (d) a pair of privacy wings secured to said body at the respective sides thereof;
    (e) said privacy wings extending forwardly from and substantially perpendicular to said body to form a resting area for a person's head;
    (f) said wings extending forwardly a sufficient distance to block off the side views of a person resting his head therebetween;
    (g) said body having its central portion made of a relatively soft, resilient material and its end portions being made of a relatively rigid, resilient material;
    (h) said wings being made of a relatively rigid, resilient material;
    (i) a pair of speakers located in each of said wings and directed inwards to said resting area; and
    (j) wherein said wings are pivotally secured to said body at the opposed ends thereof.

2. The headrest of claim 1, wherein said body has a plurality of substantially parallel reinforcing ribs therein, and wherein said body is contoured to comfortably receive a person's head thereon.

3. The headrest of claim 2 wherein the wings are secured to said body by a plurality of hinge members, one of which is embedded within each side of said body and the other of which is embedded within each wing, said hinge members allowing rotation of said wings outwardly from said body when the headrest is in an operative position, yet allowing movement of said wings towards one another, against said body, to an inoperative, stored position.

4. The headrest of claim 3 and further including a pocket in said body adapted to receive and retain advertising matter.

5. The headrest of claim 4 wherein said wings and body both have horizontally extending reinforcing ribs, and wherein said body and wings are contoured by having a relatively thin top portion and relatively thick bottom portion, thereby forming a cavity to hold and retain a person's head or pillow therein.

* * * * *